March 14, 1967 J. P. PRITCHARD, JR 3,309,680

ENHANCED VOLTAGE READOUT FOR CRYOELECTRIC MEMORIES

Filed July 13, 1966

INVENTOR
JOHN P. PRITCHARD, JR.

E. Mickey Hubbard
ATTORNEY

United States Patent Office 3,309,680

Patented Mar. 14, 1967

3,309,680
ENHANCED VOLTAGE READOUT FOR CRYOELECTRIC MEMORIES

John P. Pritchard, Jr., Richardson, Tex., assignor to Texas Instruments Incorporated, Dallas, Tex., a corporation of Delaware Filed July 13, 1966, Ser. No. 564,857
4 Claims. (Cl. 340—173.1)

Figure 1:
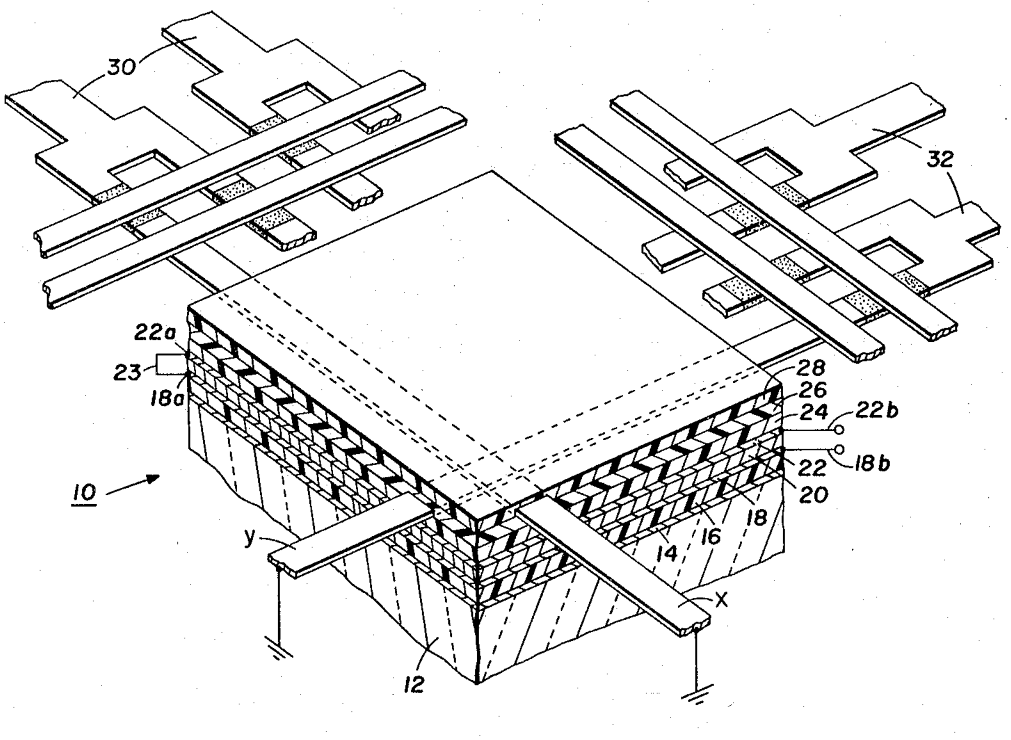

This invention relates generally to cryoelectric memory systems, and more particularly relates to a means for increasing the amplitude of the voltage pulse produced during readout.

Considerable effort has been devoted over the past several years to the perfection of memory systems utilizing the phenomenon of superconductivity at very low temperatures, usually less than 10° Kelvin. One such system is described in an article entitled, "A Large Capacity Cryoelectric Memory With Cavity Sensing," by Burns et al., p. 91, Proceedings—Fall Joint Computer Conference, 1963. The continuous sheet memory described in the publication utilizes a continuous thin film of tin for storage. Storage is achieved at the intersection of any two select drive lines by the composite magnetic field resulting from current in two lines. Readout is accomplished by sending synchronized pulses of current through the drive lines and observing a voltage pulse, or the absence of a voltage pulse, induced in a sensing means disposed on the opposite side of the storage sheet or plane. The sensing means may be either a sensing cavity or a sensing line passing diagonally to the drive lines.

This type of memory is of interest primarily in that it offers the possibility of achieving, on a practical level, high speed memories having capacities of from $10^6$ to $10^9$ storage bits. In order to provide a memory having both a high storage capacity as well as fast operation, it is necessary to achieve a very high number of storage bits, i.e., intersecting drive lines, per square inch of substrate as possible. As the widths of the select lines decrease, however, the level of current through the select lines required to threshold the underlying memory sheet decreases, and as this current decreases, the current trapped or stored in the memory sheet and the field associated with the current also decreases. Thus, when the stored current is switched off during readout, the voltage pulse induced in the sensing means is a very low value that is difficult to detect.

Therefore, the principal object of this invention is to provide a means for amplifying the readout voltage pulse in a cryoelectric system of this type, thus permitting the storage cell density to be increased so that high speed, high capacity memory systems can be realized. This is accomplished in accordance with the present invention by positioning a layer of material having a magnetic permeability greater than unity between the memory sheet and the sensing means, and particularly within the sensing cavity. In accordance with a more specific aspect of the invention, the high permeability material is a ferromagnetic thin film, such as a nickel ferrite, which also serves as an electrical insulation between the memory plane and the sensing means. In accordance with another more specific aspect of the invention, the ferromagnetic thin film material is preferably laid down in the presence of a magnetic field so that the hard axis of the thin film will be orthogonal with the axis of the current to be stored in the memory sheet.

Figure 2:
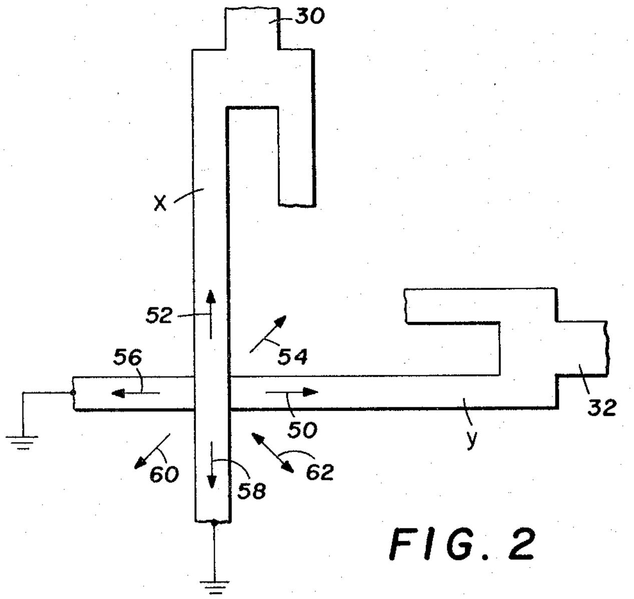

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 1 is a schematic representation of a single substrate for a cryoelectric memory system constructed in accordance with the present invention; and FIGURE 2 is a schematic plan view of the system of FIGURE 1 which seems to illustrate the operation of the present invention.

Referring now to the drawings, a typical component for a continuous sheet cryoelectric memory system constructed in accordance with the present invention is indicated generally by the reference numeral 10. The component 10 is fabricated on a glass substrate 12 which is typically from two to four inches square. A thin metallic film 14 is deposited over the glass substrate 12 and forms a ground plane. A thin layer of insulation 16 is formed over the ground plane 14 and may comprise either silicon dioxide or a suitable polymer such as a fixed photo resist. A thin metal sense plane 18 is then deposited over the insulating layer 16. The sense plane 18 is formed of a metal that is not superconductive at the operating temperature, a typical metal being silver or copper.

Next, a layer 20 of material having a magnetic permeability $\mu$ greater than one is formed over the sense plane 18, the higher the permeability of the material the better. In accordance with a more specific aspect of the invention, the layer 20 is a thin film of a ferromagnetic material of the type commonly used in thin film magnetic memories, such as the nickel-ferrite materials. The ferromagnetic material is preferably laid down under the influence of a magnetic field oriented such that the hard magnetic axis for the layer will be disposed orthogonal to the stored current as will presently be described in greater detail. A thin, superconductive memory plane 22, typically tin, is then formed over the layer 20. The memory plane 22 must be electrically insulated from the sense plane 18, and the ferromagnetic layer 20 also serves this purpose. If necessary as a result of the material used for layer 20, a very thin insulating layer may be placed between either planes 18 or 22 and layer 20. The adjacent corners **18*a* and 22*a* of the sense plane 18 and memory plane 22 are electrically connected as represented by the conductor 23, and the opposite corners form voltage sense outputs 18*b* and 22*b*. Thus, a sensing cavity is formed between the sense plane 18 and the memory plane 22, and the sensing cavity is filled with the ferromagnetic material forming the layer 20. A layer of insulation 24, which may be a polymer resulting from the fixation of a photo resist, silicon oxide, or other suitable material, is then deposited over the memory plane 22**.

Next, a plurality of parallel drive lines X, only one of which is illustrated, are formed on the insulation layer 24, then another insulation layer 26 deposited over the drive lines. A second set of drive lines Y, only one of which is illustrated, is formed over the insulation layer 26 orthogonal to the X drive lines and is covered with a final layer of insulation 28. Each area on the storage plane 22 shaded by an intersection between an X drive line and a Y drive line forms a storage cell, and the particular storage cell may be selected for either reading or writing by activating the coincident X and Y drive lines by means of X and Y cryotron switching trees 30 and 32, respectively.

In the operation of a system using the component 10, writing in a particular storage cell is achieved by passing current through the two drive lines coincident with the cell in which the binary number is to be stored. For example, a logic "1" may be written in the storage cell by passing current pulses through the X and Y drive lines in the direction of arrows 50 and 52 in FIGURE 2. The magnetic fields resulting from these currents result in a current in the memory plane generally in the direction of arrow 54 after the current through the X and Y drive lines terminates. On the other hand, a logic "0" may be stored by drive currents in the directions of arrows 56 and 58, which results in a current stored in the memory sheet in the direction of arrow 60 after the drive currents are terminated.

In order to read the logic number stored in the cell, drive current pulses are again directed through the X and Y drive lines. For example, assume that currents are directed through the X and Y drive lines in the direction of arrows 50 and 52. If a logic "1" is stored in the cell, i.e., if the current is in the direction of arrow 54, then the magnetic fields of the currents through the drive lines and that of the current stored in the memory sheet will be sufficient to switch the storage sheet in the area beneath the intersection back to the normal or resistive stage, thus terminating the current in the memory sheet. As a result of the termination of this current, the magnetic field previously existing in the high permeability layer 20, that is within the sense cavity, will change, thus producing a voltage pulse across the outputs 18*b* and 22*b*. On the other hand, if a logic "0" is stored, as indicated by current in the direction of arrow 60, then the magnetic fields of the three currents will tend to subtract, rather than add, and the memory sheet will remain superconductive. As a result, no change will occur in the flux within the sensing cavity and no voltage pulse will be produced at the output. Thus, the value stored in the cell can be deduced from the presence or absence of the output voltage pulse.

In all systems of this type heretofore constructed, silicon oxide or other low permeability material has been used as the insulation between the memory plane 22 and the sense plane 18. In accordance with the present invention, the amplitude of the voltage pulse is significantly amplified by the ferromagnetic layer 20. Since the amplification achieved is directly related to the increase in the permeability, within certain limits, the permeability of the layer 20 should be as high as practical, and in any case greater than unity. In accordance with a more specific aspect of the invention, the ferromagnetic thin film layer 20 is laid down in the presence of a magnetic field oriented so that the hard axis M of the thin film will form orthogonal to the axis of the current to be stored in the memory plane 22, which is along the double-ended arrow 62. By orienting the hard axis M orthogonal to the current stored in the memory plane, the linear characteristics, rather than the square loop characteristics, of the ferromagnetic material are utilized so that more uniform pulse outputs can be obtained.

Although a preferred embodiment of the invention has been described in detail, it is to be understood that various changes, substitutions and alterations can be made therein without departing from the spirit and scope of the invention as defined by the appended claims.

What is claimed is:

1. In a cryoelectric memory system, the combination of:

a superconductive memory plane, write and read drive line means disposed adjacent one side of the memory plane for selectively storing an idle current in the memory plane and for selectively switching the stored idle current off, a layer of material having a magnetic permeability greater than unity disposed adjacent the memory plane on the side of the memory plane opposite the drive line means such that the magnetic field from an idle current stored in the memory plane will pass through the layer of material, and sensing means disposed adjacent the layer of material for sensing changes in the magnitude of the magnetic field within the layer of material.

2. The combination defined in claim 1 wherein the sensing means is comprised of:

a conductive layer disposed on the layer of material, and means completing a circuit through the memory plane and the conductive layer whereby changes in the magnitude of the magnetic field within the layer of material will produce a voltage pulse across the conductive layer.

3. The combination defined in claim 2 wherein the layer of material is a thin film of ferromagnetic material.

4. The combination defined in claim 3 wherein the ferromagnetic material has a hard magnetic axis resulting from the deposition of the material under the influence of a magnetic field, and the hard magnetic axis is disposed orthogonal to the idle currents stored in the memory plane.

No references cited.

BERNARD KONICK, *Primary Examiner.*

T. W. FEARS, *Assistant Examiner.*